(12) United States Patent
Brooks

(10) Patent No.: US 10,064,478 B2
(45) Date of Patent: Sep. 4, 2018

(54) ROTARY GROUND AUGER BASE AND FEEDER STAND

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

( * ) Notice: Subject to any disclaimer, the term of this patent is extended or adjusted under 35 U.S.C. 154(b) by 0 days.

(21) Appl. No.: 15/454,481

(22) Filed: Mar. 9, 2017

(65) Prior Publication Data

US 2017/0251792 A1    Sep. 7, 2017

Related U.S. Application Data

(63) Continuation-in-part of application No. 14/999,090, filed on Mar. 29, 2016, which is a continuation-in-part of application No. 14/999,498, filed on Feb. 25, 2016, now Pat. No. 9,854,899.

(60) Provisional application No. 62/389,738, filed on Mar. 9, 2016.

(51) Int. Cl.
| | |
|---|---|
| *A01K 1/04* | (2006.01) |
| *A45F 3/44* | (2006.01) |
| *A01K 39/01* | (2006.01) |
| *A01M 31/00* | (2006.01) |
| *A01K 5/015* | (2006.01) |
| *E02D 5/80* | (2006.01) |
| *F41B 5/14* | (2006.01) |

(52) U.S. Cl.
CPC ............... *A45F 3/44* (2013.01); *A01K 5/015* (2013.01); *A01K 39/0106* (2013.01); *A01M 31/00* (2013.01); *A01M 31/008* (2013.01); *E02D 5/801* (2013.01); *F41B 5/1453* (2013.01)

(58) Field of Classification Search
CPC .......... A01K 1/04; E04H 12/22; A01M 31/06; F21V 21/08
See application file for complete search history.

(56) References Cited

U.S. PATENT DOCUMENTS

| | | |
|---|---|---|
| 32,226 A | 4/1861 | Dotson |
| 168,890 A | 10/1875 | Field |
| 345,877 A | 7/1886 | Brainard |
| 907,799 A | 12/1908 | Hawley |
| 1,562,343 A | 11/1925 | Post |
| 2,269,996 A | 1/1942 | Milton et al. |
| 2,447,444 A | 8/1948 | Waite |
| 2,563,159 A | 8/1951 | Louis |
| 2,001,789 A | 9/1959 | Frank |
| 3,059,732 A | 10/1962 | Hammack |
| 3,286,962 A | 11/1966 | Warth |
| 3,318,560 A | 5/1967 | Garrette, Jr. et al. |

(Continued)

*Primary Examiner* — Amy J. Sterling
(74) *Attorney, Agent, or Firm* — Carrithers Law Office, PLLC

(57) ABSTRACT

A feeder stand including a rotary ground auger and base holds a feeder above the ground. An upright elongated rod defines a stand supported by an auger having helical coils removably screwed into the ground. A platform such as a round disc, or wire mesh platform is supported on the top distal end of the rod. At least two opposing legs extend perpendicular to the vertical elongated rod and auger forming a base. The distal end of selected opposing legs are bent or angled upward perpendicular from the ground forming handles for rotating the auger into the ground. The portion of the legs extending outward normal to the elongated support pole provides a base bearing against the ground for increased lateral support.

13 Claims, 4 Drawing Sheets

(56) References Cited

U.S. PATENT DOCUMENTS

| | | |
|---|---|---|
| 3,688,454 A | 9/1972 | Wolfcarius |
| 4,928,418 A | 5/1990 | Stelly |
| 5,098,057 A | 3/1992 | Gran |
| 6,116,760 A | 9/2000 | Cox |
| 6,412,236 B1 | 7/2002 | Johnson |
| 6,481,147 B2 | 11/2002 | Lindaman |
| 6,487,977 B1 | 12/2002 | Willaims |
| 6,698,132 B1 | 3/2004 | Brint |
| 6,810,630 B2 | 11/2004 | Chizmas |
| 6,901,693 B1 | 6/2005 | Crowe |
| D550,071 S | 9/2007 | Powell |
| D554,980 S | 11/2007 | Mihelis |
| 7,493,873 B2 | 2/2009 | Petersen |
| 8,230,638 B1 | 7/2012 | Dunaway |
| 2005/0268522 A1 | 12/2005 | Foster |
| 2014/0332645 A1 | 11/2014 | Brooks |

ROTARY GROUND AUGER BASE AND FEEDER STAND

CROSS REFERENCES TO RELATED APPLICATIONS

This application claims priority from U.S. Provisional Application Ser. No. 62/389,738 filed on Mar. 9, 2016 and is Continuation-In-Part of U.S. application Ser. No. 14/999,090 filed on Mar. 29, 2016 which is a Continuation-In-Part of U.S. application Ser. No. 14/999,498 filed on Feb. 25, 2016 all of which are incorporated herein in their entirety.

TECHNICAL FIELD

The present invention relates to the field of removable and portable feeder stands.

BACKGROUND OF THE INVENTION

Birds, Duck, turkey, geese and other water fowl hunters and bird watchers use feeders for attracting the fowl. Often times, feeders are supported on a pole, anchored, or supported by a stake which holds the feeder in a preferred position which is likely to attract feeding fowl. Some feeding stands have one or more spikes which are hammered into the ground with a hammer, rock, limb, or other tool; however, problems occur due to the inability to penetrate the earth, or the stand becoming loose due to wind and wear so that it falls over or the decoy spins around in an undesirable position.

SUMMARY OF THE INVENTION

A rotary auger feeder provides a means for securely supporting heavy feed for birds or other animals such as compressed seed block and mineral blocks and removably but securely holding a feeder above the ground. The stand includes an upright elongated rod with an auger comprising helical coils or flights having a point at the lower distal end to be fixedly and removably screwed into the ground to support the stand in an upright position. The top end of the elongated rod supports a platform such as a round disc, or wire mesh platform. Just above the auger at least two outward extending opposing legs extend normal to or perpendicular to the vertical elongated rod and auger forming a base when the auger portion is screwed into the ground. The distal end of each of the opposing legs are bent or angled upward perpendicular from the ground a selected distance forming handles for the purpose of rotating the auger into the ground. It is contemplated that three or four legs may comprise the base with all or alternate legs including an upturned distal end portion forming handles. The auger is intended to be cranked until the at least two outward extending legs come to bear against the ground for increased lateral support.

The rotary ground auger base and stand are anchored to the ground for securely holding a removable or mounted feeder at a selected level above the ground. The stand comprises and/or consists of a base for resting on the ground having a vertical shaft or rod extending upward therefrom for holding supporting a feeder. An auger comprising a plurality of helical coil or flights form a spiral extending below the base forming a point at the lower distal end which is be fixedly and removably screwed into the ground to support the stand in an upright position.

A rotary mounting stand for removably holding a feeder above the ground. The stand includes an upright elongated rod with an auger comprising helical coils at the lower distal end to be fixedly and removably screwed into the ground to support the stand in an upright position. The top end of the elongated rod supports a platform such as a round disc, or wire mesh platform. At least two opposing legs extend perpendicular to the vertical elongated rod and auger forming a base when the auger portion is screwed into the ground. The distal end of selected opposing legs are bent or angled upward perpendicular from the ground a selected distance forming handles for the purpose of rotating the auger into the ground. It is contemplated that braces extending from the distal ends of opposing legs to a selected point on the central elongated rod above the ground may also provide a handle for rotating the helical auger into the ground. The portion of the legs extending outward normal to the elongated support pole provides a base bearing against the ground for increased lateral support.

The base comprises at least two outward extending opposing legs extending normal to or perpendicular to the vertical rod providing lateral support to the base when the auger portion is screwed into the ground. The distal end of each of the opposing two legs are bent or angled upwardly extending upward generally perpendicular to the ground a selected distance forming handles. It is contemplated that three or four legs could be provided for the base with each leg or alternation legs including an upturned distal end portion defining handles. The handles provide a leverage means for the purpose of rotating the auger into the ground. The auger is intended to be cranked or rotated until the outward extending legs of the base are generally horizontal to the ground and bear against the ground for increased lateral support.

The top end of the rod includes an adapter for cooperatively engaging a feeder and/or camera or other item to be mounted thereon. The supported item includes a base or receiver or adapter for cooperatively engaging the top portion of the stand support rod configured, sized and shaped to correspond to the mounting base of a selected device to be supported on the stand. The feeder may also comprise a disc of a selected size, flat plate, or mesh platform. It is contemplated that the disc may include a plurality of apertures formed therein for draining water.

The portable rotary ground auger base stand is designed for removably holding a feeder, camera or other selected device upright above the ground and anchoring the base within the ground to prevent the supported object from tipping over and to prevent the stand from twisting or rotating from the desired position during use. The stand includes an upright rod with a helical coil of helical flights of metal forming a ribbon coiled therearound having a point at the lower distal end to be fixedly and removably screwed into the ground to support the rod or stand in an upright vertical position. The top end of the rod forming the stand has an adapter such as a lug or cap configured, sized and shaped to correspond to the mounting base of a selected device to be supported on the stand. Examples of a lug configuration is a rod with threads, or a top hat configuration or a square ended rod for cooperative engagement with a receiver of a feeder or other object such as a camera adapter. The outward extending legs have upward extending handles at the free ends for the purpose of cranking the coil into the ground. The coil is intended to be cranked until the outward extending legs come to bear against the ground for increased lateral support. In one preferred embodiment the legs oppose one another; however it is contemplated that four legs or more may be used to comprise the base. At least two of the legs would include vertical arms for gripping to be used as handles for rotation of the auger into the ground.

It is an object of this invention to provide a rotary ground auger base and stand for supporting a feeder/camera, wherein the stand includes a helical coil at one end which can be screwed into the ground.

It is an object of this invention to provide a rotary ground auger base and stand which includes an integral crank handle for the purpose of screwing the stand into the ground.

It is an object of this invention to provide a rotary ground auger base and stand which includes an integral crank handle for the purpose of screwing the stand into the ground and at least two laterally extending legs just above a helical coil so that when the coil is screwed completely into the ground, the legs come to bear on the ground.

It is an object of this invention to provide a rotary ground auger base and stand with a helical coiled at one end and an opposite end which is square for receiving a duck feeder.

It is an object of this invention to provide a rotary ground auger base and stand with a helical coil at one end and a crank handle which can be used to thread the coil into the ground, thus forming a rigid connection with the ground and providing secure support for a feeder.

It is an object of this invention to provide a rotary ground auger base and stand which also includes a loop for attaching a jerk line to the upper end of the feeder stand.

It is an object of this invention to provide a rotary ground auger base and stand threads at the top distal end of the support rod for cooperatively engaging a game camera.

It is an object of this invention to provide a rotary ground auger base and stand with a receiver at the top end for holding a standard camera wherein the receiver includes rod portion with ¼ inch by 20 threads and the rod portion is adjustably attached to the top end of the stand so that the camera may be held at any desired angle.

It is an object of the present invention to form the elongated member from metal tubing or solid stock.

It is an object of the present invention to include an elongated support member comprising a unitary member or a an elongated support consisting of two of more segments which join together.

It is an object of the present invention to optionally be able to use a piece of all thread welded in tubing or coupling to fasten a plate onto an elongated member.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
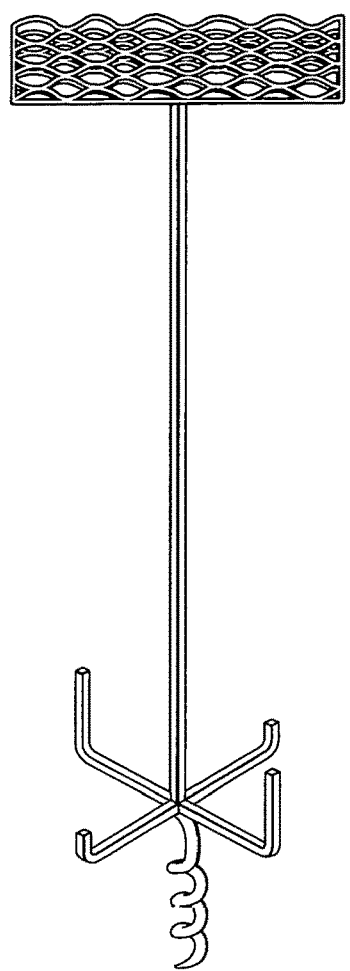
FIG. 1 is a perspective view of the rotary ground auger base and stand showing the spiral auger extending from the lower distal end of the vertical support rod with a plurality of lateral support legs disposed normal thereto above the spiral including upturned distal end portions forming handles on one pair of opposing legs and a mesh platform supported on top.
Figure 2:
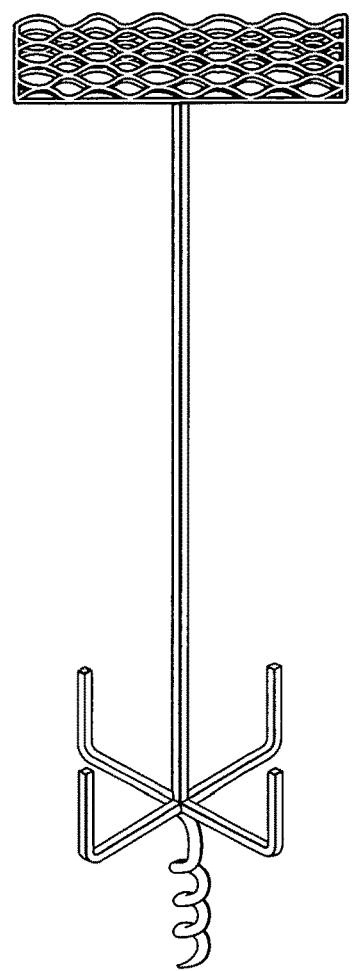
FIG. 2 is a perspective view of the rotary ground auger base and stand showing the spiral auger extending from the lower distal end of the vertical support rod with a plurality of lateral support legs disposed normal thereto above the spiral including upturned distal end portions forming handles on both pairs of opposing legs and a mesh platform supported on top.
Figure 3:
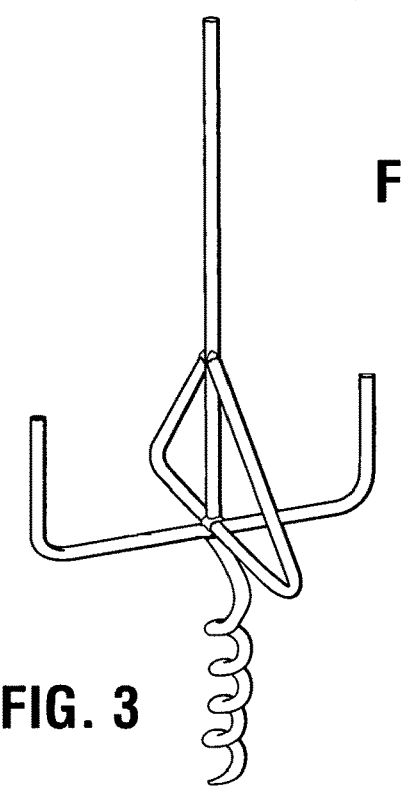
FIG. 3 is a perspective view of the rotary ground auger base and stand showing the spiral auger extending from the lower distal end of the vertical support rod with a plurality of lateral support legs disposed normal thereto above the spiral including upturned distal end portions forming handles on one pair of opposing legs and a second pair of opposing legs having the distal ends bent inwardly at selected angles toward the elongated vertical center rod and having the distal ends welded thereto forming braces.

In accordance with the present invention, there is provided a rotary ground auger base and stand 10 for holding a feeder or camera in a raised position above the ground for the intended use.

The rotary auger support stand includes a bottom section extending from a bottom distal end of the medial section, the bottom section comprising a helical spiral coil extending downward therefrom a selected distance including a tapered point for penetration into the ground. A medial section extends upward from the bottom section having a generally vertical rod. A handle section extending from the medial section comprising a curved rod forming at least one "S" shaped loop comprising a first horizontal segment extending outwardly from the medial section at a generally 90 degree angle a selected first length and having a proximate end portion curving upward forming a first 180 degree curved loop extending upward and over the first horizontal segment and past the medical section a selected second length defining a second horizontal section spaced apart from and in alignment with the first horizontal section, the second horizontal segment forming a second 180 degree curved loop extending upward and over a portion of the second horizontal segment forming a third horizontal segment extending to the medial section spaced apart and in alignment with the second horizontal segment, the third horizontal segment forming a generally 90 degree angle extending upward forming a top section comprising a rod in vertical alignment with the medial section for supporting an article thereon.

Auger

As shown in the figures, the helical auger is shown as a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

A preferred embodiment of the helical auger includes a top vertical portion for mounting an adapter or article to be supported thereon, a neck, a main body portion and a tip portion including a distal end forming a wedge or pointed segment.

The rotary auger support includes an above ground upright rod or shaft top portion having an offset neck connecting to a main body portion comprising a plurality of helixes. A distal end segment comprises a half helix ending in a sharp point.

The auger includes a main body portion helixes is comprised of bar stock having a cylindrical or square cross sectional area. The corners or the square bar stock form cutting edges when the stock is bent or formed into a helix. One preferred embodiment of the instant invention includes a main body portion having three full helixes and a tip portion comprising a half helix. The neck of the rotary auger support is angled inwardly toward the center of the main body portion in order to center the shaft top portion with respect to the main body portion. The neck portion includes a helix first segment, a short straight inward angled second segment, a straight angled third segment, and a short straight outward angled fourth segment, connecting to a vertical straight top segment of a desired length.

The rotary auger having a bottom portion for insertion into the ground comprises a helical coil having a cutting edge which functions as a plurality of flights forming an auger having cutting edges with a wedge point at the lower distal end to be fixedly and removably screwed into the ground to support the rotary auger support in an upright position.

The angle of the twists forming the flights of the helix of the main body portion are angled forming a helix. The cutting edges of the helix enable the auger to cut through soil and debris for ease of rotation and deep ground penetration which includes the desirable features of helix flights. Moreover, the auger of the present invention is an improvement over the flights of conventional augers in that the narrow diameter of the stock and diameter of the flights enables the auger to cut and drill through small openings in rocky soil and wedge between rocks. Moreover, the rotary auger support of the present invention can be rotatably inserted into hard clay which would resist penetration by an auger having flights.

More particularly, the rotary auger feeder includes a helical auger portion comprising a selected length of bar stock having a square cross sectional area including a bottom portion bent into a helix. The helix comprises a vertical straight top segment, a neck portion extending downward from the vertical straight top segment, a main body portion extending downwardly from the neck portion, the main body portion comprising a helical coil extending downward therefrom a selected distance and having a helical pitch of 2 for every 3.5 revolutions and a variable pitch of 3.0 for every 0.25 revolutions, a distal end segment comprising a half helical coil extending downward from the main body portion, and a distal end segment including a point for penetration into the ground. A handle extends upward from the vertical straight top segment. A vertical straight top portion extends upward from the handle, and means for mounting an object thereon extends from the top end of the vertical straight top portion.

The main body portion of the auger comprises a pitch diameter of 1.375 inches and a helical pitch of 2.0 inches. The helical coil of the helical auger portion includes the main body portion and the distal end segment comprises a cylindrical or square bar stock defining a cutting edge at each corner of the square bar stock. The handle comprising a curved portion having at least one "S" shaped loop extending upwardly from a top distal end of the medial section comprising a rod having at least two opposing looped sections spaced apart from and in alignment with one another, the at least two opposing looped sections including a first portion extending outwardly from the medial section at a right angle and a second portion extending upwardly over and spaced apart from and in alignment with the first portion forming a first curved loop extending past medial section a selected equal distance from the medial section and a third top portion extending upwardly over and spaced apart from and in alignment with the second portion forming a second curved portion extending a selected distance in alignment with the medial section. The mounting means extends from the vertical straight top portion. The mounting means may comprising a loop extending from a distal end of the vertical straight top portion and include a loop, hook, or tubular member extending from a bottom portion of the vertical straight top portion.

As shown in FIG. 1-11, the rotary ground auger base and stand 10 comprises or consists of a base having legs extending therefrom. An elongated shaft 12 with a threaded distal top end 22 at the top extends from a vertical rod or shaft extending from the base which sets on the ground. An auger comprising a helical coil 20 extends from the bottom of the base and includes spaced apart opposing laterally extending legs 11, 13, 14 and 16 for providing additional lateral support by bracing the stand against the ground. Legs 13 and 14 are opposite one another as are legs 11 and 16. Legs 13 and 14 have upward extending arms 15 which are used as hand cranks to screw the helical coil 20 into the ground until the legs are in contact with the ground. As an option, the legs are braced against rod 12 by triangular shaped braces 18. It is contemplated that all of the legs include upwardly extending arms forming handles projecting from the distal ends of each leg; however, at least a pair of opposing legs are provided with arms for rotation of the auger into the ground.

The rotary auger feeder includes means for mounting an article on the distal end of the elongated rod selected from the group consisting of a cap, a cylindrical sleeve, a square sleeve, a longitudinal extension having a means for mounting an object thereon, a cylindrical lug, a square lug, a threaded lug, a threaded sleeve, a threaded plate, a plate including a lug on a bottom surface, a plate having a sleeve on a bottom surface, a plate having a coupling on the bottom surface, a plate having a throughbore therein, a coupling, a lug of a selected shape for supporting an object thereon, and a sleeve of a selected shape for supporting an object thereon.

Figure 4:
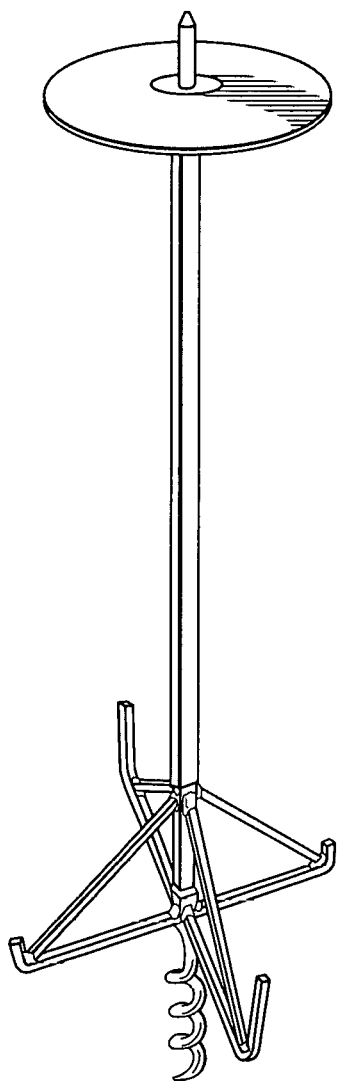
FIG. 4 is a perspective view of the rotary ground auger base and stand showing the spiral auger extending from the lower distal end of the vertical support rod with a plurality of lateral support legs disposed normal thereto above the spiral including upturned distal end portions forming handles on one pair of opposing legs and a second pair of opposing legs disposed there between including braces extending from the distal end portion of the legs forming the base extending inwardly at an acute angle to a selected height and welded to a central elongated support member supporting a flat disc or plate thereon having a stub extending therefrom.
Figure 5:
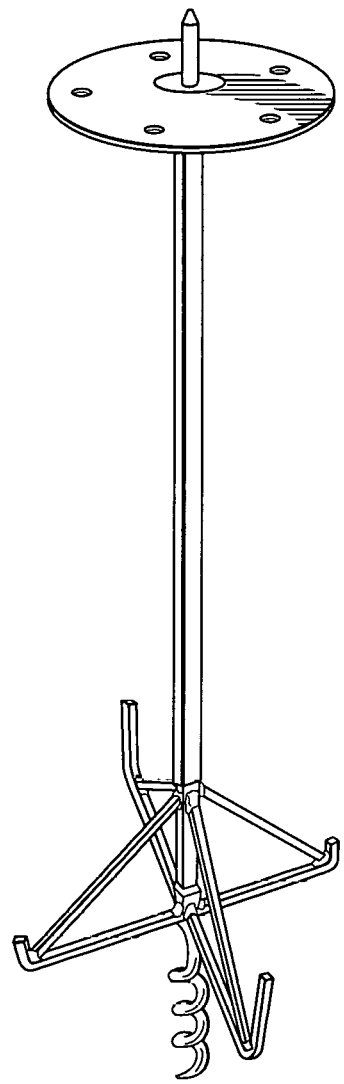
FIG. 5 is a perspective view of the rotary ground auger base and stand of FIG. 4 showing the auger and a flat plate having a plurality of holes therein.
Figure 6:
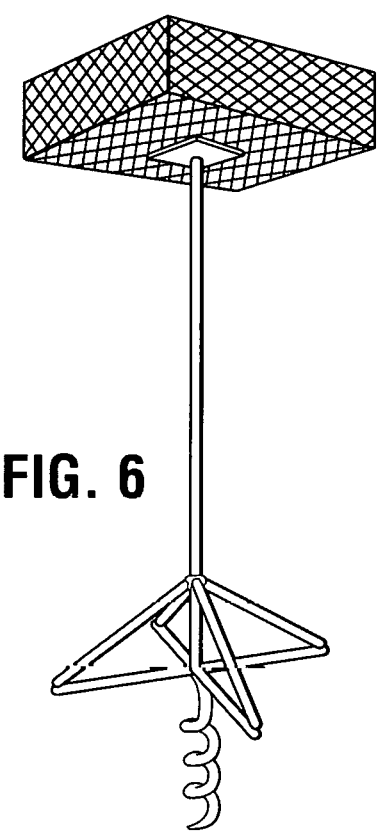
FIG. 6 is a perspective view of the rotary ground auger base and stand showing the spiral auger extending from the lower distal end of the vertical support rod with a plurality of lateral support legs disposed normal thereto above the spiral including upturned distal end portions bent inwardly at selected angles toward the elongated vertical center rod and having the distal ends welded thereto forming braces which function as handles to rotate the auger into the ground.
Figure 7:
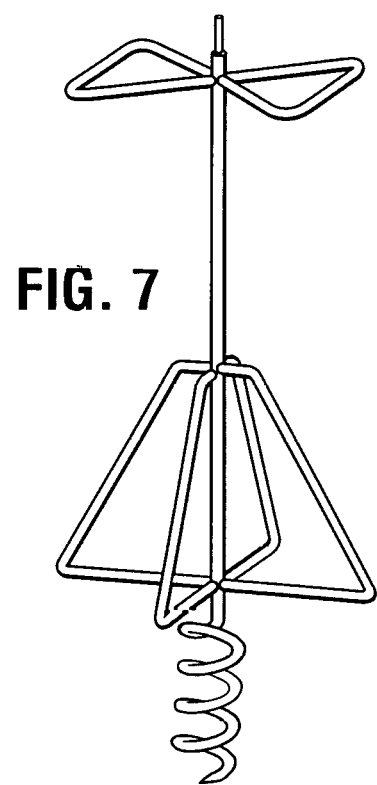
FIG. 7 is a perspective view of the rotary ground auger base and stand showing the spiral auger extending from the lower distal end of the vertical support rod with a plurality of lateral support legs disposed normal thereto above the spiral including upturned distal end portions bent inwardly at selected angles toward the elongated vertical center rod including a second angle near the end forming a short horizontal segment having the distal ends welded to the central elongated support member forming braces which function as handles to rotate the auger into the ground and including a flat hourglass shaped support frame supported by the top distal end of the elongated support member including means for attachment extending therefrom defining a threaded lug.
Figure 8:
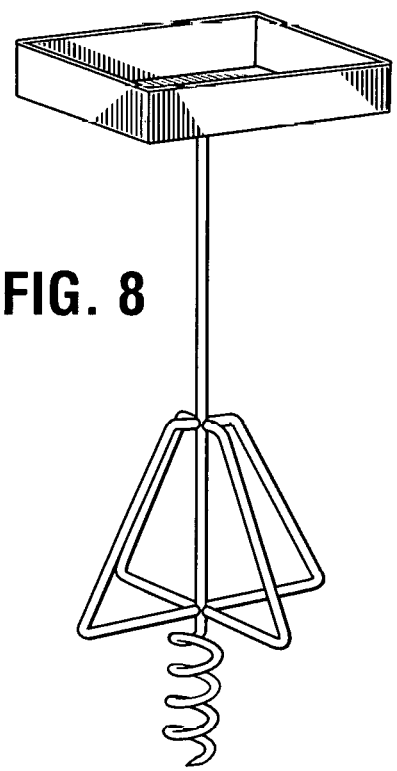
FIG. 8 is a perspective view of the rotary ground auger base and stand of FIG. 7 including a feeder box mounted thereon having a bottom connecting to front, back and side panels.
Figure 9:
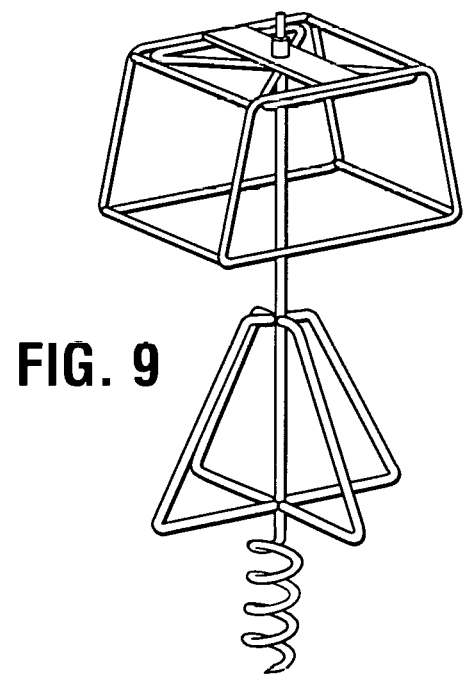
FIG. 9 is a perspective view of the rotary ground auger base and stand showing the spiral auger extending from the lower distal end of the vertical support rod with a plurality of lateral support legs disposed normal thereto above the spiral including upturned distal end portions bent inwardly at selected angles toward the elongated vertical center rod including a second angle near the end forming a short horizontal segment having the distal ends welded to the central elongated support member forming braces which function as handles to rotate the auger into the ground and including an inverted rectangular prism shaped support frame mounted onto a top distal end of the elongated support member including means for attachment extending therefrom defining a threaded lug.
Figure 10:
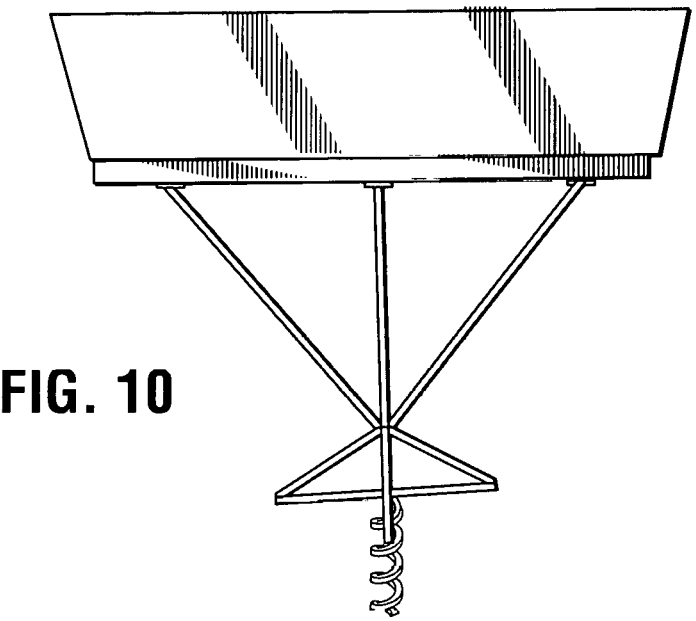
FIG. 10 is a perspective view of the rotary ground auger base and stand showing the spiral auger extending from the lower distal end of the vertical support rod with a plurality of lateral support legs disposed normal thereto above the spiral including upturned distal end portions bent inwardly at selected angles toward the elongated vertical center rod and having the distal ends welded thereto forming braces which function as handles to rotate the auger into the ground supporting a rectangular prism shaped feeder box supported by a plurality of arms extending from said central elongated support member at a point above the attachment point of the support leg braces.

An alternative embodiment of the rotary ground auger base and stand 50 is shown in FIG. 4. The stand 50 includes two legs 14 and 16 that are foldable for storage. Triangular shaped braces comprise folding brace arms 52 which are hinged at the connecting point with the rod 12 by top hinge 51, by medial hinge 53 at the middle of the folding brace arms 52, and by base hinge 56 at the lateral legs 11 and 16 extending from the base. The legs 11 and 16 are hinged at the rod 12 just above the helical coil 20 by hinge 54 enabling the legs to be folded inwardly for packaging and transport or storage.

Moreover, in an alternative embodiment, hinges 51 can be connected to a sliding cylinder or ring which allows the top end of the brace arms 51 to slide up and down the rod.

Still other alternative embodiments have two, three or more than four laterally extending legs for bracing but in any case, at least two of the legs includes an upward extending rod 15 at the free ends for screwing the helical coil 20 into the ground.

The rotary ground auger base and stand may include a vertical telescoping shaft or rod extending upward from the base wherein a pin or spring loaded detent (ball and socket) is utilized to hold the shaft at an extended or collapsed condition.

A lower portion of one embodiment of the rotary auger stand includes a longitudinal rod held within an adjustable tripod with a locking thumbscrew and a plurality of legs. The longitudinal rod has a helical coil at the lower end thereof. The rotary auger legs can be rigid wherein the tripod brace legs can be telescoping or slidably moved therealong into a selected bracing position. Moreover, the rotary auger legs may also be vertically hinged at the vertical support rod wherein the tripod brace legs can be used to lock the rotary legs in place providing a base with enhanced lateral support. The rotary auger feeder may also be provided with an extension means for cooperatively engaging and holding an object cooperatively engages an extension member having a top distal end including means for mounting an article thereon or thereto as set forth heretofore. The extension is attached to the elongated rod extending from the auger by cooperatively engaging means such as a threaded lug and threaded sleeve, lug and sleeve, bolts or pins extending through aligned holes formed in perpendicular to a top and bottom section of coaxial elongated support members or twist and tighten coaxial extension members.

The mesh platform supported on top of the elongated support member is comprised of metal or plastic and can have a solid bottom or perforated or mesh bottom and side panels for holding mineral blocks, compressed seed blocks or loose feed and seed aggregates. The platform can include a lug or sleeve or coupling which cooperatively engages a mating lug, sleeve, or coupling extending from the top distal end of the elongated support member. The platform may also be mounted onto a plate extending from the elongated member by fastening means such as screws or rivets.

The rotary ground auger base and stand may also have a spiral auger extending from the lower distal end of the vertical support rod with a plurality of lateral support legs disposed normal thereto above the spiral including upturned distal end portions forming handles on one pair of opposing legs and a second pair of opposing legs disposed there between including braces extending from the distal end portion of the legs forming the base extending inwardly at an acute angle to a selected height and welded to a central elongated support member supporting a flat disc or plate thereon.

Figure 11:
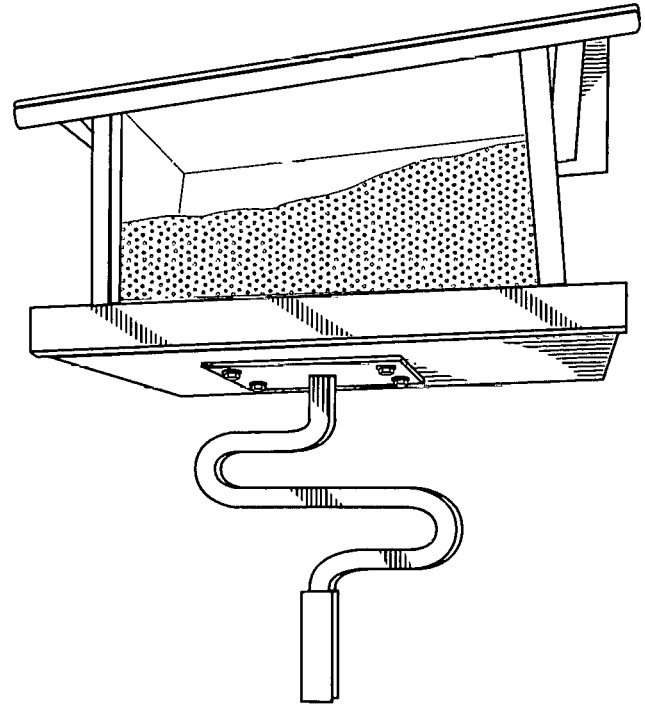
FIG. 11 is a perspective view of a bird feeder supported by a plate mounted onto a top distal end of the elongated support member and an "S-shaped" curved handle formed in the elongated member in close proximity to the mounting means.

As shown in FIG. 11, the rotary auger feeder may also include an "S-shaped" handle portion extending from the vertical support rod or shaft, an integral handle having "s" shaped loops extending from a medial portion of the elongated shaft. More particularly, the a medial section defining a handle comprises at least one curved "S" shaped loop portion including a first straight section extending outwardly from said elongated rod at a selected angle from said top distal end of said elongated rod, a first curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger stand comprising:
a medial portion comprising an elongated rod having at least one section;
a bottom portion comprising a helical spiral coil having a point extending downward from said elongated rod for a selected distance for penetration into the ground;
handle means for rotating said rotary auger decoy stand formed at a selected position of said medial portion, said handle comprising at least one curved "S" shaped loop portion including a first straight section extending outwardly from said elongated rod at a selected angle from said top distal end of said elongated rod, a first, curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section; and a holding means supporting an article thereon or attached thereto and wherein said article is selected from the group consisting of a feeder, a birdhouse, a basket, a plate, and combinations thereof.

2. The rotary auger stand of claim 1, wherein said medial section, said decoy supporting section, and said bottom section are integrally formed from a single elongated rod.

3. The rotary auger stand of claim 1, wherein said holding means is selected from the group consisting of a cap, a cylindrical sleeve, a square sleeve, a longitudinal extension having a means for mounting an object thereon, a cylindrical lug, a square lug, a threaded lug, a threaded sleeve, a threaded plate, a plate including a lug on a bottom surface, a plate having a sleeve on a bottom surface, a plate having a coupling on the bottom surface, a plate welded to a top distal end of said elongated rod, a plate having a throughbore therein, a coupling, a lug of a selected shape for supporting an object thereon, and a sleeve of a selected shape for supporting an object thereon.

4. The rotary auger stand of claim 1, wherein said holding means comprises a sleeve disposed on a top distal end of said top portion sized and shaped for coaxial cooperative engagement with a decoy support member extending from said decoy including a retaining means for releasably and immovably securing said article from said holding means.

5. The rotary auger stand of claim 1, wherein said a medial portion comprising an elongated rod having at least one section comprises at least two sections removably coupled together.

6. The rotary auger stand of claim 1, said helical spiral coil further comprising:
a selected length of bar stock having a square cross sectional area including a bottom portion bent into a helix;
a vertical straight top portion;
a neck portion extending downward from said vertical straight top portion; a main body portion extending downwardly from said neck portion, said main body portion comprising a helical helix coil extending downward therefrom a selected distance;
a distal end segment comprising a half helix extending downward from said main body portion; and
said distal end segment including a point for penetration into the ground
a handle section further comprising a loop including a first portion extending outwardly from said medial section at a right angle and a second portion extending upwardly over and spaced apart from and in alignment with said first portion extending past said medial section a selected equal distance from said medial section and a third portion extending downward spaced apart from and in alignment with said second portion extending inwardly a selected distance in alignment with said medial section
and a holding means supporting an article thereon or attached thereto and wherein said article is selected from the group consisting of a feeder, a birdhouse, a basket, a plate, and combinations thereof.

7. The rotary auger stand of claim 6, wherein said main body portion comprises a helical pitch of 2 for every 3.5 revolutions and a variable pitch of 3.0 for every 0.25 revolutions.

8. The rotary auger stand of claim 6, wherein said main body portion comprises a helical pitch of 2.0 inches.

9. A rotary auger stand comprising:
a) an elongated medial section comprising at least one elongated vertical rod;
b) a handle section integrally formed from said elongated medial section at a selected position, said handle section comprising at least one loop including a first portion extending outwardly from said medial section at a right angle and a second portion extending upwardly over and spaced apart from and in alignment with said first portion extending past said medial section a selected equal distance from said medial section and a third portion extending downward spaced apart from and in alignment with said second portion extending inwardly a selected distance in alignment with said medial section;
c) means for mounting an article on a top distal end of said medial section above said handle section wherein said article is selected from the group consisting of a feeder, a birdhouse, a basket, a plate, and combinations thereof;
d) a bottom section extending from said medial section below said handle section, said bottom section comprising a helical auger portion comprising:
i) a selected length of bar stock having a bottom portion bent into a helix comprising:
ii) a vertical straight top segment;
iii) a neck portion extending downward from said vertical straight top segment;
iv) a main body portion extending downwardly from said neck portion, said main body portion comprising a helical coil extending downward therefrom a selected distance;
v) a distal end segment comprising a helical coil portion extending downward from said main body portion; and
vi) said distal end segment including a point for penetration into the ground.

10. The rotary auger stand of claim 9, wherein said medial section comprises at least two detachable sections joined in cooperative engagement.

11. The rotary auger stand of claim 9, wherein said means for mounting is selected from the group consisting of a cap, a cylindrical sleeve, a square sleeve, a longitudinal extension having a means for mounting an object thereon, a cylindrical lug, a square lug, a threaded lug, a threaded sleeve, a threaded plate, a plate including a lug on a bottom surface, a plate having a sleeve on a bottom surface, a plate having a coupling on the bottom surface, a plate welded to a top distal end of said elongated rod, a plate having a throughbore therein, a coupling, a lug of a selected shape for supporting an object thereon, and a sleeve of a selected shape for supporting an object thereon.

12. The rotary auger feeder of claim 9, wherein said helical auger portion comprising a square bar stock defines a cutting edge at each corner of said square bar stock.

13. The rotary auger feeder of claim 1, wherein said helical auger portion comprising a square bar stock defines a cutting edge at each corner of said square bar stock.

\* \* \* \* \*